United States Patent [19]

Winterfeld

[11] Patent Number: 4,801,917
[45] Date of Patent: Jan. 31, 1989

[54] TURN SIGNAL APPARATUS

[76] Inventor: Donald E. Winterfeld, Box 215, Sioux Center, Iowa 51250

[21] Appl. No.: 104,931

[22] Filed: Oct. 6, 1987

[51] Int. Cl.$^4$ ................................................ B60Q 1/46
[52] U.S. Cl. .................................... 340/81 R; 340/82; 340/84; 340/87; 340/102; 307/10 LS
[58] Field of Search ............... 340/81 R, 82, 87, 100, 340/102, 107, 109, 134, 696, 84, 90; 307/10 LS

[56] References Cited

U.S. PATENT DOCUMENTS

| | | | |
|---|---|---|---|
| 2,975,401 | 3/1961 | Shupe | 340/102 |
| 3,512,288 | 5/1970 | Hall | 340/87 |
| 3,518,624 | 6/1970 | Smith, Jr. | 340/87 |
| 3,691,366 | 9/1972 | Spreuer | 340/87 |
| 4,297,675 | 10/1981 | Rubottom et al. | 340/107 |

Primary Examiner—Donnie L. Crosland
Attorney, Agent, or Firm—Leon Gilden

[57] ABSTRACT

Signaling apparatus for use in conjunction with agricultural vehicles. A plurality of signaling devices are magnetically securable to a drawn vehicle such as a trailer and are controlled by a remote-control switching device. The signaling devices are formed with permanent magnets upon a rearward facing surface enabling the signaling apparatus to be readily repositioned upon a variety of utility vehicles.

1 Claim, 1 Drawing Sheet

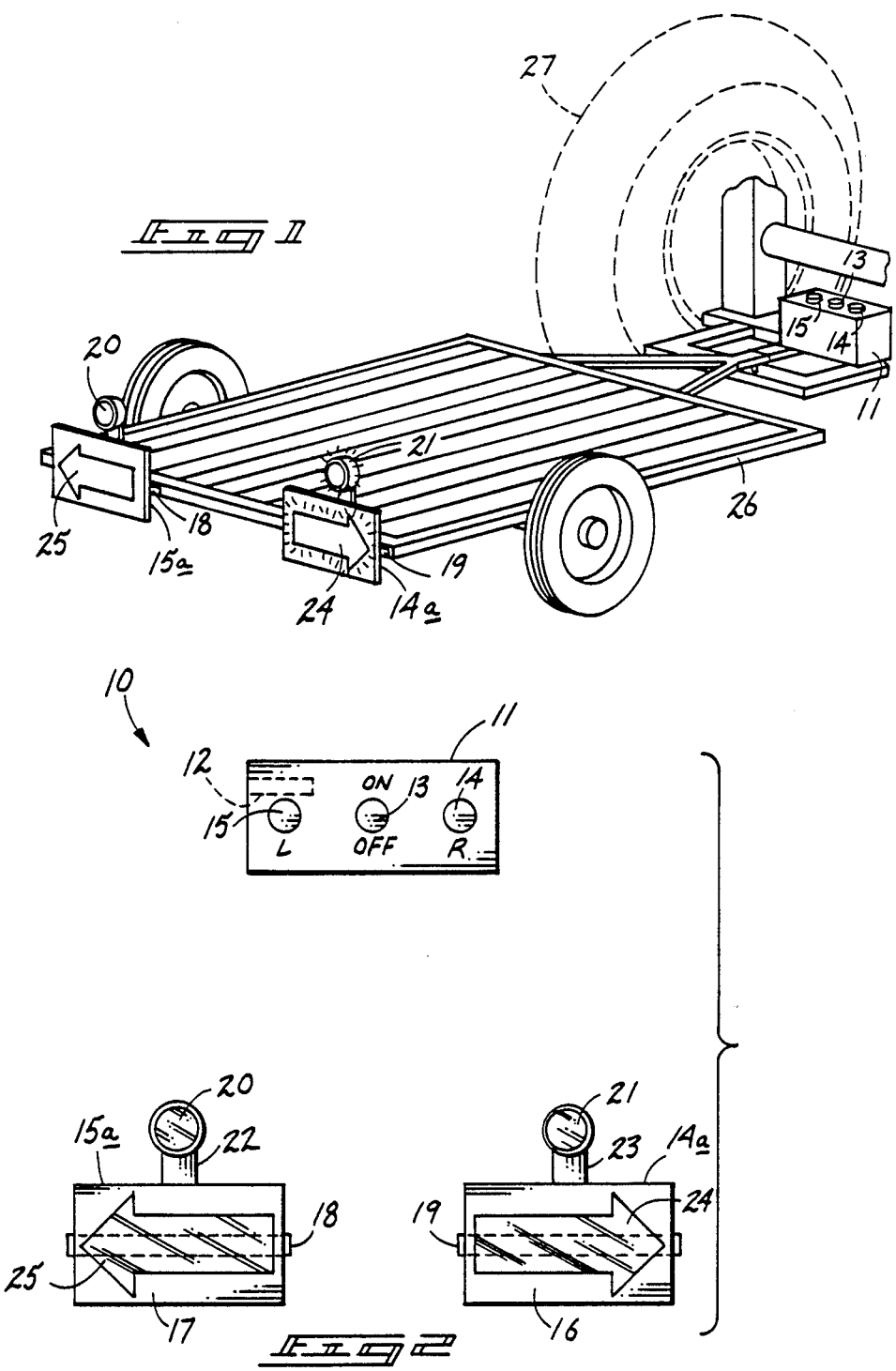

TURN SIGNAL APPARATUS

BACKGROUND OF THE INVENTION

1. Field of the Invention

The present invention relates to signaling apparatus and more particularly pertains to a new and improved signaling apparatus which may be magnetically securable to a wide range of vehicles particularly trailer-like vehicles for temporary use in over-the-road situations mandating the use of a signaling means.

2. Description of the Prior Art

The use of signaling devices is well known in the prior art. As can be appreciated, these devices have normally involved permanent wiring or different types to enable these devices to effectively functioning for their intended purpose. In this connection, there have been several attempts to develop signaling devices which may be readily and efficiently utilized. For example, U.S. Pat. No. 2,044,300 to Hans illustrates the use of a signaling device with particular message illustratable thereon and of conventional permanent wiring to the chassis of a motor vehicle. While a functional solution for a particular situation, the hard wiring of the passing indication apparatus performs a function that is not of universal applicability and furthermore the apparatus lack clarity due to the non-uniform message formed on the included lenses.

U.S. Pat. No. 2,854,650 to Baker is another in a series of hard wired signs to inform a following motor vehicle whether or not it be safe to pass said vehicle. Again, the hard wiring of the sign limits application to a single vehicle and furthermore is positionally configured to be somewhat difficult to understand due to relative size and complexity of the included message formed on the signaling apparatus itself.

U.S. Pat. No. 3,471,829 to Kahn discloses the use of sequential signaling device of again conventional hard wiring to a particular vehicle limiting use thereof to that particular vehicle.

U.S. Pat. No. 3,683,330 to Lancaster is a further example of a message display sign to be positioned centrally of a trailered vehicle to indicate to a following motorist whether it may or may not be safe to pass. As in other prior art, limited application due to the hard wiring and complex message positioned on the sign, results in a signaling device of limited application and of confusing message conveyance.

U.S. Pat. No. 4,495,553 to Haynes illustrates an arrow indication device of again hard wired nature for use with a motorcycle indicating a desired turn maneuver by a user thereof. Again the problem of providing an easily securable and adaptable turn signaling apparatus for use with a multitude of vehicles and particularly trailers has not been addressed.

As such it can be appreciated that there is a continued need for a new and improved turn signaling device which addresses both the problem of adaptability and ease of use and in this respect, the present invention substantially fulfills this need.

SUMMARY OF THE INVENTION

In view of the foregoing disadvantages inherent in the known types of turn signaling apparatus now present in the prior art, the present invention provides an improved turn signaling apparatus that may be readily and selectively positioned on a multitude of vehicles with plural distinct indicating indicia of distinctive coloration to be easily and efficiently utilized and observed in use. As such, the general purpose of the present invention, which will be described subsequently in greater detail, is to provide a new and improved turn signaling apparatus which has all the advantages of the prior art signaling apparatus and none of the disadvantages.

To attains this, the present invention utilizes a plurality of independent turn signaling modules to indicate a right or left hand turn situation. Each module includes a large indicating arrow of a majority of the module's forward surface area. In addition thereto a spaced indicator of a further coloration to that of the indicator arrow is utilized to provide unmistakable notice to a following vehicle of the intention of the user of my invention. Further, the use of permanent magnets secured to a rear surface of the discrete modules enables the turn signal modules to be instantly adhered to an appropriate trailer surface. A remote control unit of conventional construction is utilized to selectively actuate either module.

My invention resides not in any one of these features per se. but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved turn signal apparatus which has all the advantages of the prior art turn signal apparatus and none of the disadvantages.

It is another object of the present invention to provide a new and improved turn signal apparatus which may be easily and efficiently manufactured and marketed.

It is a further object of the present invention to provide a new and improved turn signal apparatus which is of a durable and reliable construction.

An even further object of the present invention is to provide a new and improved turn signal apparatus which is susceptible of a low cost of manufacture with regard to both materials and labor, and which accordingly is then susceptible of low prices of sale to the consuming public, thereby making such turn signal apparatus economically available to the buying public.

Still yet another object of the present invention is to provide a new and improved turn signal apparatus which provides in the apparatuses and methods of the prior art some of the advantages thereof, while simultaneously overcoming some of the disadvantages normally associated therewith.

Still another object of the present invention is to provide a new and improved turn signal apparatus of module construction.

Yet another object of the present invention is to provide a new and improved turn signal apparatus wherein module construction including self-contained power supply such as dry-cell batteries is utilized.

Even still another object of the present invention is to provide a new and improved turn signal apparatus with permanent magnets secured to a rearward face enabling attachment as desired to a multitude of vehicles.

Another object of the present invention is to provide a new and improved turn signal apparatus utilizing a remote control switching device to selectively energize either of a pair of turn signal module as desired.

A further object of the invention is to enable farmers to effect turns when visibility behind them is limited due to the pulling of large wagons.

Another object of the invention is to assist in the prevention of road accidents involving farmers effecting turns due to limited rear visibility.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric view of the present invention as installed onto a typical trailer as utilized in commerce and particularly in agriculture.

FIG. 2 is a top orthographic illustration depicting the top operative surface of my remote control device and the configuration of the indicative surface of my individual turn signal modules.

DESCRIPTION OF THE PREFERRED EMBODIMENT

With reference now to the drawings, and in particular to FIG. 2 thereof, a new and improved turn signal apparatus embodying the principles and concepts of the present invention and generally designated by the reference numeral 10 will be described.

More specifically, it will be noted that turn signal apparatus includes a remote control device 11 of conventional construction including a battery containment compartment illustrated in phantom at 12 for powering the remote control device. A push-button for on/off control of the device is positioned centrally of the top forward face of the device with a button 14 to energize a right turn indicator module 14a and a left turn button 15 to energize a left turn module 15a, as illustrated in FIG. 2. Each module 14a and 15a each containing replaceable battery supplies (not shown) furnishing power for said modules. Respective right and left turn modules 14a and 15a are configured with forward surfaces 16 and 17 as mirror images of one another. Positioned along rearward facing surfaces of the respective modules are permanent magnets indicated at 18 and 19 respectively. Such magnets are of sufficient strength and force to enable secure and sure attachment to a preselected metal portion of a vehicle. Also positioned on forward faces 17 and 16 respectively are flashing red light structures 20 and 21 spaced above faces 17 by use of standards 22 and 23. The flashing of lights 20 and 21 is effected by actuation of either respective turn signal module.

Right turn module 14a and left turn module 15a have positioned in prominent illuminated orientation to indicate a right and left turn respectively, indicator arrows 24 and 25 for right and left turn module respectively. Indicator arrows 24 and 25 are formed of a yellow tinted glass in conjunction with yellow bulbs to indicate a glowing yellow light upon energization of a preselected right or left turn button by the control device. Accordingly when either module 14a or 15a is activated, a respective indicator arrow and flashing light act in concert. In contrast to the yellow turn arrows, the flashing lights 20 and 21 are red. The combination therefore of the red flashing lights 20 and 21 with the yellow or amber colored arrows 24 and 25 provide a clear unmistakable indication of turning intention by a user.

As to the manner of usage and operation of the present invention, the same should be apparent from the above description and illustrations. However, a further discussion relative to the manner and usage of operation will be further provided. In use, one merely attaches by means of the magnetic securement elements 18 and 19 the right and left turn modules 14a and 15a upon a typical trailer apparatus 26. The user, while riding in a tractor-like device 27, will position the remote control device 11 conveniently to enable easy access thereto. When a right turn, for example, is desired the user will push button 14 thereby energizing module 14a whereupon amber turn arrow 24 will be illuminated as well as red flashing light 21 to act in concert with amber light 24. The combination of the red and amber in concert provides an unmistakable and clear indication of an imminent turning event to a following vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed as being new and desired to be protected by Letters Patent of the United States is as follows:

1. A turn signal apparatus for temporary use in conjunction with trailered vehicles comprising, a control device, and a
 a plurality of signaling modules including a remote control device an a right and left signaling module;
 said remote control device and said turn signaling modules each provided with individual power supply sources;
 each signaling module further including an indicator arrow means and a flashing light means on a forward surface of each module for indication of turning direction to energization of said remote control device, and
 wherein said indicator arrow means and said flashing red light means act simultaneously upon energization of said remote control device, and
 wherein said turn signal module has secured on a rearward surface thereof parallel to said forward surface, a permanent magnet for temporary attachment of said modules to a desired and pre-selected vehicle, said permanent magnet medially positioned on each rearward surface and of greater length than each module for enhanced securement and alignment with said vehicle wherein each magnet extends beyond each side of a respective signaling module, and
 wherein said flashing red light means are positioned in a spaced and elevated position above companion indicator arrow means, and
 wherein said indicator arrow means and said flashing light means are formed of contrasting colors for enhanced indication of a turning event.

* * * * *